United States Patent [19]
Bowers

[11] Patent Number: 5,934,725
[45] Date of Patent: Aug. 10, 1999

[54] EXTENDABLE VEHICLE BED SLIDING TRAY

[76] Inventor: Jerald A. Bowers, 46613 Barbara Dr., Macomb Township, Mich. 48044

[21] Appl. No.: 08/871,736

[22] Filed: Jun. 9, 1997

[51] Int. Cl.[6] .................................................. B60P 3/40
[52] U.S. Cl. ..................... 296/26.09; 296/37.6; 414/522
[58] Field of Search ............................ 296/26.08, 26.09, 296/26.12, 26.13, 165, 170, 37.6; 414/522; 224/403, 404; 312/334.8, 334.12, 334.14, 334.15

[56] References Cited

U.S. PATENT DOCUMENTS

| | | |
|---|---|---|
| D. 371,535 | 7/1996 | Young . |
| 2,549,018 | 4/1951 | Sarlo ...................................... 296/26.09 |
| 3,004,790 | 10/1961 | Mayer .................................. 296/26.09 |
| 4,573,731 | 3/1986 | Knaack et al. .......................... 296/37.6 |
| 4,629,390 | 12/1986 | Burke . |
| 4,685,857 | 8/1987 | Goeser et al. ........................... 414/522 |
| 4,909,558 | 3/1990 | Roshinsky ............................. 296/37.6 |
| 4,990,049 | 2/1991 | Hargrove . |
| 5,052,878 | 10/1991 | Brockhaus ......................... 296/37.6 X |
| 5,098,146 | 3/1992 | Albrecht et al. ..................... 296/26.09 |
| 5,167,434 | 12/1992 | Bott . |
| 5,456,511 | 10/1995 | Webber ................................ 296/26.09 |
| 5,513,941 | 5/1996 | Kulas et al. . |
| 5,564,767 | 10/1996 | Strepek . |
| 5,584,524 | 12/1996 | Vogel . |

*Primary Examiner*—Joseph D. Pape
*Attorney, Agent, or Firm*—Harness, Dickey & Pierce, P.L.C.

[57] ABSTRACT

An extendable load bearing apparatus that protects the bed of a pickup truck from damage caused by unloading and loading objects into and out of the bed, and that protects the bed from otherwise compromising weather-related elements. The apparatus includes a load bearing tray that has longitudinal sides, a forward end, and a rear end, and that has downwardly projecting tray supports extending substantially along the longitudinal sides of the tray. The apparatus also includes a plurality of rollers each housed within a roller bracket and secured to a workpiece. Each of the plurality of rollers is in supporting relationship with one of the pair of downwardly extending tray supports. At least one axle extends transversely from each of the pair of downwardly extending tray supports. A wheel is mounted in rotatable relationship to each of the axles to facilitate movement of the load bearing tray in a longitudinal direction. A pair of channel brackets is secured to the workpiece, with each of the wheels being housed within one of the channeled brackets to limit movement of the load bearing sliding tray in a longitudinal direction. The rollers and the wheels function as load bearing members that support the sliding tray to maximize the load bearing capability of the sliding tray regardless of the position of the tray in relation to the pair of channel brackets.

19 Claims, 6 Drawing Sheets

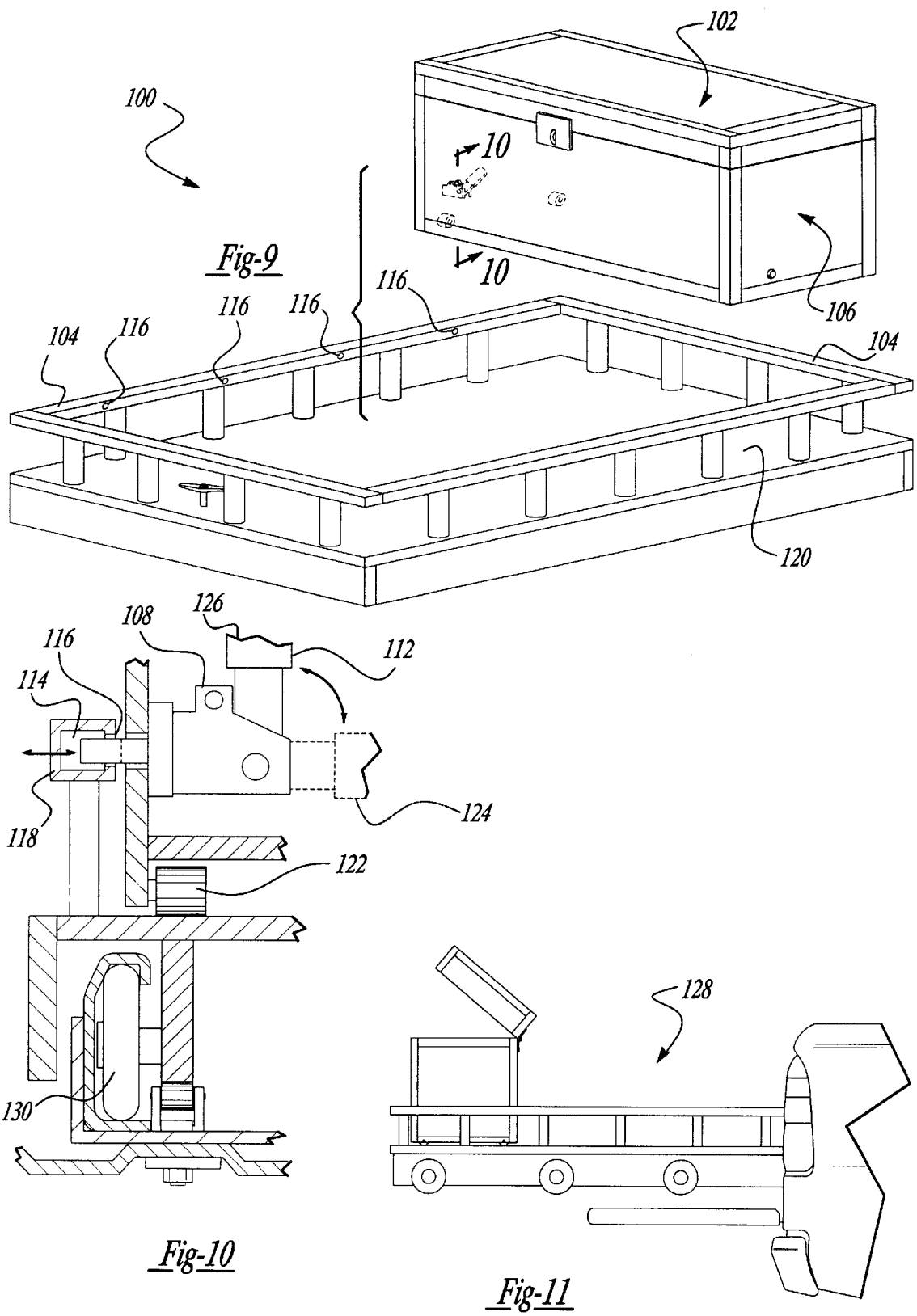

EXTENDABLE VEHICLE BED SLIDING TRAY

TECHNICAL FIELD

The present invention relates generally to vehicle bed adapters and more particularly to an extendable vehicle bed tray that is designed for easy installation, that is capable of withstanding heavy payloads in both an extended and a retracted position, and that is designed to store payloads in one of many selectively adjustable locations.

DISCUSSION

Vehicle beds such as pickup truck beds are often subjected to substantial amounts of abuse during loading and unloading thereof. Repeated loading and unloading of the bed with heavy objects over time often results in dents, scratches and otherwise compromises the aesthetic and structural integrity of the bed.

Although the bed is typically protected by several coats of paint, the paint is often worn away over time. As the paint is worn away, exposure to weather-related elements, such as rain, snow, and other undesirable elements, such as salt spray from salted highways during the winter months, eventually causes metal beds to rust, thereby further compromising the structural integrity of the bed, and the vehicle itself.

With regard to pickup truck beds, a cab or shell can be installed to cover the bed and protect the bed from the above elements. However, such shells are often expensive, cumbersome to install and aesthetically unpleasing to many truck owners. In addition, such shells have limited access to the truck bed, and therefore makes loading and unloading of the truck difficult in many situations. In addition, the bed is still susceptible to dents and scrapes associated with everyday usage of the truck bed for payload transport purposes.

Additionally, permanently attached vehicle bed liners have been utilized to protect truck beds from the above described damaging elements. These liners are typically formed from molded plastic and are designed to cover the truck bed to protect the bed from potentially damaging payloads and weatherrelated elements.

A perceived disadvantage of the molded plastic truck bed liners is that they withstand only minimal loads, particularly if the truck bed liner is in an extended position. Further, a liner that only covers the bed of the truck expose the sidewalls to potential damage, while liners that provide a protective shell for both the sides and the bed liner tends to accumulate water. Also, while certain bed liners include certain retainers to minimize shifting of cargo payload during transit, such retainers are cumbersome to adjust. In addition, payloads secured by the known retainers are still readily accessible to passersby, particularly if the truck is not covered by a cab or other type of protective shell, and still expose the payload to weather-related elements.

SUMMARY OF THE INVENTION

In accordance with the present invention, an extendable vehicle bed sliding tray is provided that overcomes many, if not all, of the above described limitations. The vehicle bed sliding tray of the present invention protects the truck bed as well as the bed side walls, without accumulating water and moisture within the bed itself. The tray of the present invention is also capable of supporting heavy payloads regardless of the location of the payload on the tray and regardless of the extended or retracted position of the tray portion supporting the payload. Another important feature of the present invention is the ability to load and unload objects to and from the vehicle bed without having to physically enter the bed itself. The vehicle bed sliding tray of the present invention is also designed with an integral storage device that is capable of being positioned in one of many locations on the bed liner itself and secured at that position to hold the payload and to minimize shifting of the payload. The tray of the present invention is also designed for easy installation as an aftermarket product, as it does not require expensive tools or labor for installation.

In particular, the present invention provides an extendable load bearing apparatus that protects the bed of a pickup truck from damage caused by unloading and loading objects into and out of the bed, and that protects the bed from otherwise compromising weather-related elements. The apparatus includes a load bearing tray that has longitudinal sides, a forward end, and optionally, but preferably, a rear end. The apparatus also includes projecting tray supports extending substantially along the longitudinal sides of the tray. Further, the apparatus includes a plurality of rollers each housed within a roller bracket which is secured to the vehicle bed. Each of the plurality of rollers is in supporting relationship with one of the pair of downwardly extending tray supports.

Further, at least one axle extends transversely from each of the pair of downwardly extending tray supports. A wheel is mounted in rotatable relationship to each of the axles to facilitate movement of the load bearing tray in a longitudinal direction. A pair of channeled brackets is secured to the workpiece, with each of the wheels being housed within one of the channeled brackets to limit movement of the load bearing sliding tray in a longitudinal direction. The rollers and the wheels function as load bearing members that support the sliding tray to maximize the load bearing capability of the sliding tray regardless of the position of the tray in relation to the pair of channeled brackets.

These and other various advantages and features of the present invention will become apparent from the following description and claims, in conjunction with the appended drawings.

BRIEF DESCRIPTION OF THE DRAWINGS

FIG. 9 is a perspective view of a second preferred embodiment of the present invention showing a storage container mounted to the tray;

FIG. 10 is a sectional view of the storage container shown in FIG. 9 along section line 9—9;

FIG. 11 is a side elevational view of the tray shown in FIG. 9, with the tray and the storage container being extended out of the truck bed.

DETAILED DESCRIPTION OF THE PREFERRED EMBODIMENTS

Figure 1:
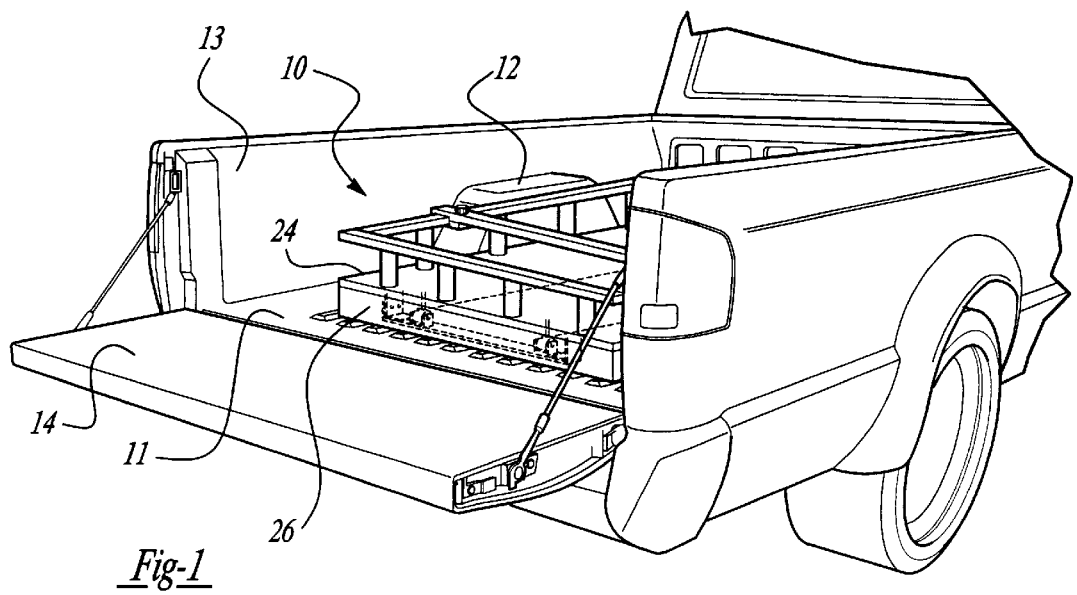
FIG. 1 is perspective view of the extendable vehicle truck bed sliding tray of the present invention installed in the bed of a pickup truck.
Figure 2:
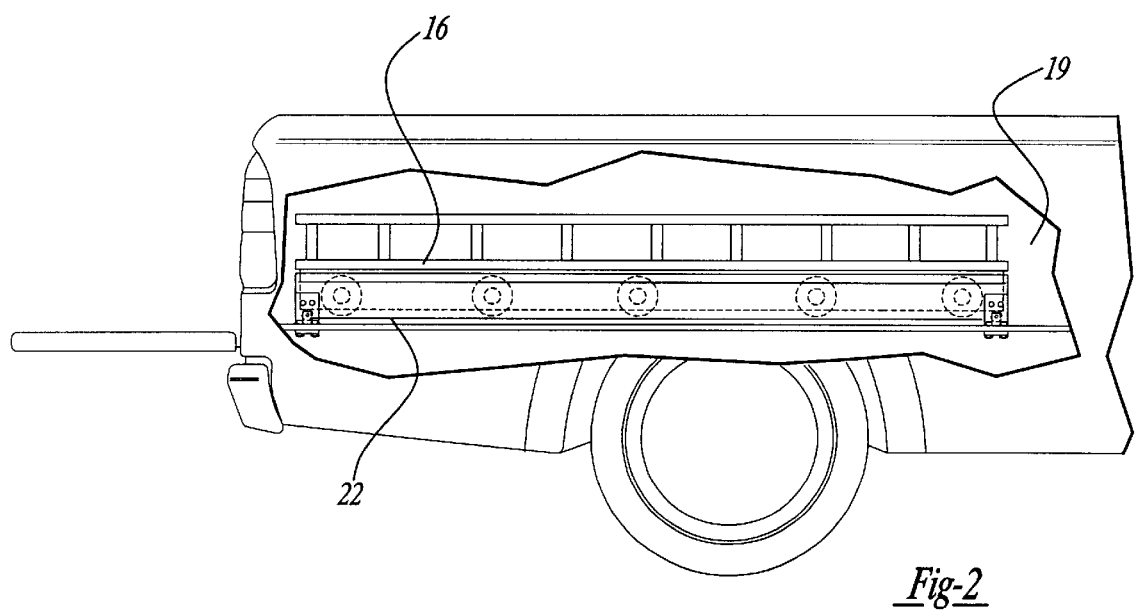
FIG. 2 is a side elevational view of the tray shown in FIG. 1, with a portion of the pickup truck bed side panel cut away to show the details thereof.

Referring to the drawings, a perspective view of the adjustable vehicle bed sliding tray according to the preferred embodiment of the present invention is shown generally at 10. The tray 10 is mounted to a pickup truck bed 11 between truck wheel wells 12 defined in side walls 13. The tray 10 protects a substantial portion of both the truck bed 11, as well as truck gate 14, from damage caused by loading and unloading heavy objects, abrasive objects and caused by weather-related elements. The tray 10 also permits objects to be loaded and secured within the pickup truck bed in a manner that prevents shifting of the objects while the truck is in transit. The tray is designed to withstand heavy loading forces regardless of the placement location of the payload on the tray, and regardless of the extended or retracted position of the tray relative to the pickup truck bed. The sliding tray of the present invention is also designed to be easily installed as an after-market product without the need for skilled personnel or expensive assembly tools.

Figure 3:
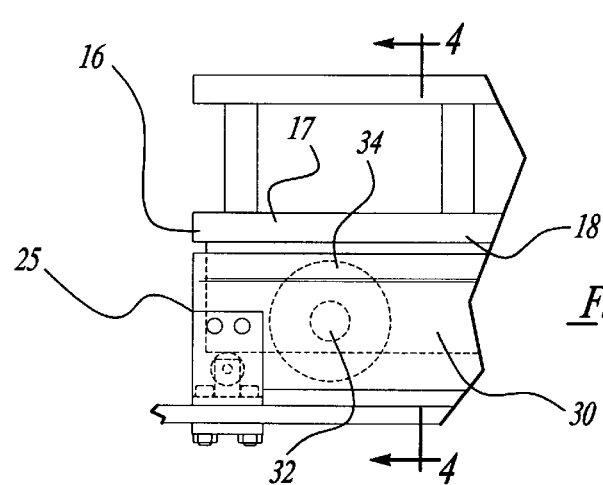
FIG. 3 is an enlarged view of the rearward end of the tray of FIG. 2.
Figure 4:
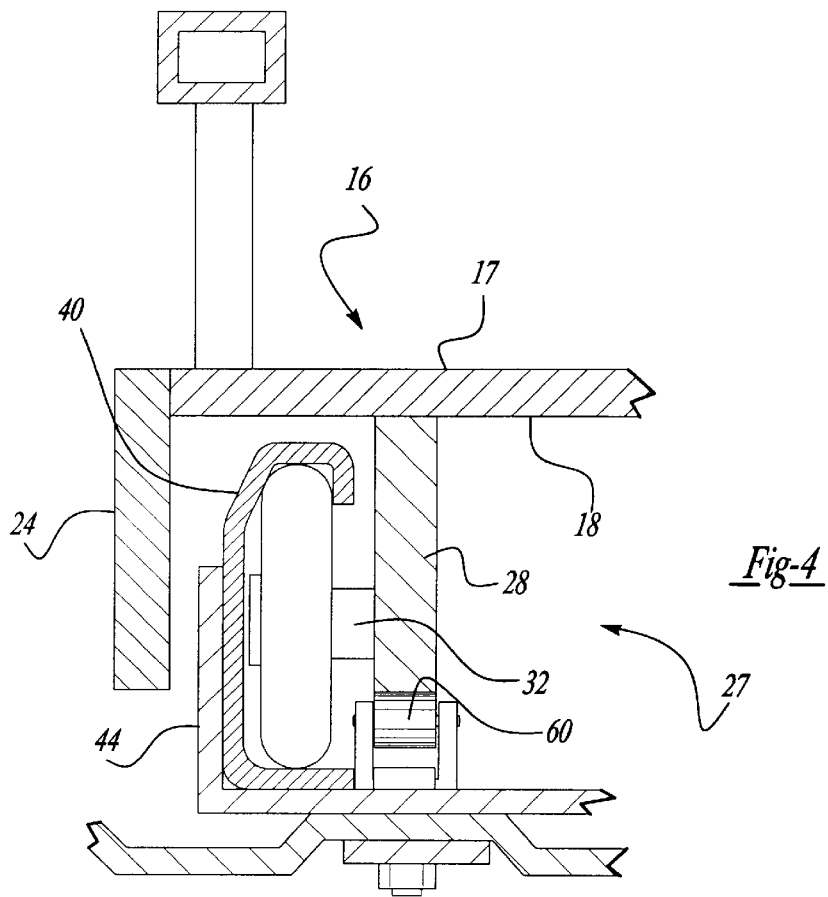
FIG. 4 is a sectional view of the tray of FIG. 3 through section line 4—4, showing the tray wheels, which facilitate movement of the tray, mounted thereto.

Referring now to FIGS. 1–5, the tray includes a load-bearing platform 16 that covers a substantial portion of the truck bed 11. The platform includes both a top load-bearing surface 17 and a bottom support surface 18. As shown in FIG. 6, the platform has a forward end 19, two longitudinally extending sides 20, 21 and a rearward end 22. The ends and sides 19–22 include walls 23–26, respectively, that extend downwardly from the platform 16 to define a substantially enclosed volume 27 underneath the platform (FIG. 4).

Referring now specifically to FIGS. 3 and 4, wheel mounting bars 28, 30 are affixed to the bottom surface 18 of the platform and extend longitudinally underneath the platform in substantially parallel relationship with the side walls 24, 25. A plurality of axles 32 extend transversely from each of the wheel mounting bars 28, 30. Wheels 34 are rotatably mounted to the axles 32 to facilitate bidirectional sliding of the platform as indicated by the directional arrow A in FIG. 4. The walls 23–26 protect wheels 34 from dirt, debris and other foreign objects that could otherwise impede the sliding movement of the tray.

Figure 8:
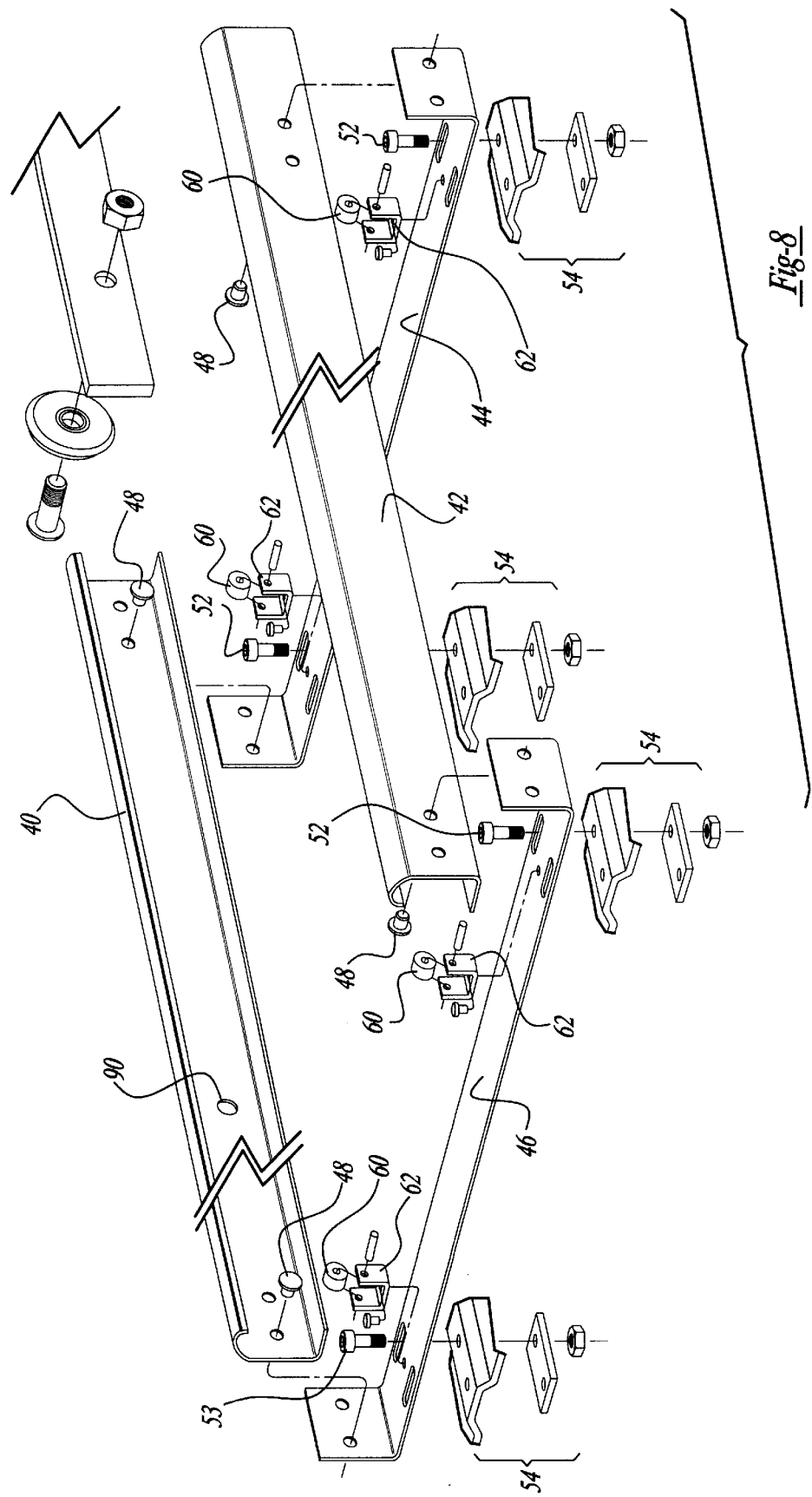
FIG. 8 is an exploded view of the brackets used to mount the tray shown in FIG. 1 to the pickup truck bed.

Referring to FIG. 8, the wheels 34 are housed in C-shaped channel brackets 40, 42 to limit wheel movement, and thus platform movement, to a bi-directional longitudinal movement. The channel brackets 40, 42 are bolted or otherwise affixed to mounting bars 44, 46 via threaded fasteners, such as the threaded fasteners 48. The mounting bars 44, 46 are longitudinally spaced apart from one another and are bolted to the bed of the truck through mounting holes (not shown), via bolts 52 and tray mounting brackets 54, as shown in FIG. 8.

It should be appreciated that the mounting holes essentially constitute the only modification that must be made to the truck bed to prepare the bed for installation of the tray of the present invention. Therefore, the sliding tray of the present invention may be marketed and sold as an after-market product, as it requires minimum expense in assembly and vehicle assembly preparation.

Still referring to FIGS. 4 and 8, rollers 60 are rotatably mounted within roller brackets 62, which in turn are bolted to the mounting bars 44, 46 also via the bolts 52. The roller brackets are bolted to the mounting bars in spaced-apart relation to provide further support to the wheel mounting bars 26, 28 in a slidable, load-bearing relationship. The rollers therefore allow the tray to support payloads when the tray is in an unextended position of up to approximately the maximum amount the truck chassis can bear. Further, when the sliding tray is in a fully extended position, i.e. about four feet, the rollers are capable of handling at least about 1,000 pounds, which is considered to be significantly more than conventional slidable truck bed liners can support.

Thus, the platform positioning/load-bearing capabilities of both the wheels 34 and the rollers 60 increase the structural integrity and durability of the sliding tray of the present invention when compared to conventional truck liners.

Referring to FIG. 6, uniformly-spaced support rods, such as the rod 66, are secured to the platform and support a tray side rail 68 affixed thereto. The side rail extends around the periphery of the platform to prevent objects from sliding or rolling off of the tray. The side rail therefore protects the side walls of the truck from damage caused by unsecured objects placed on the platform without defining an enclosure that accumulates water, as do many conventional truck bed liners.

Still referring to FIG. 6, a movable cargo bar 70 is adjustably associated with the rail 68. Releasable clamps 72 and threaded fasteners 74 fasten the cargo bar to the side rail and secure the cargo bar 70 in a desired cargo-holding location. In addition, a net 76, including fastening rings 78, is securable to the rail to further secure a payload to the tray 10 and to further prevent shifting of the payload during movement of the truck.

Figure 6:
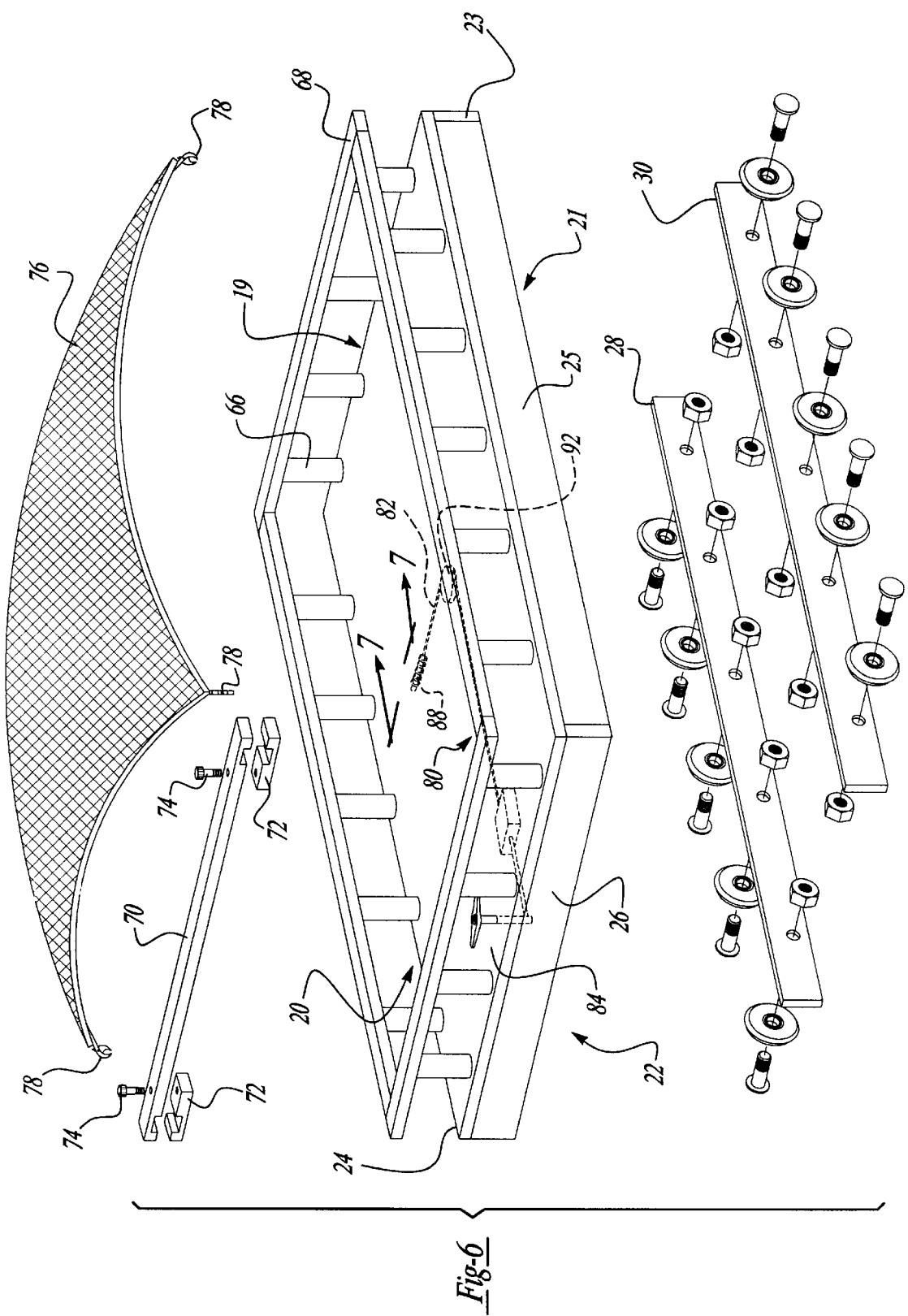
FIG. 6 is an exploded view showing the tray in FIG. 1 in detail.
Figure 7:
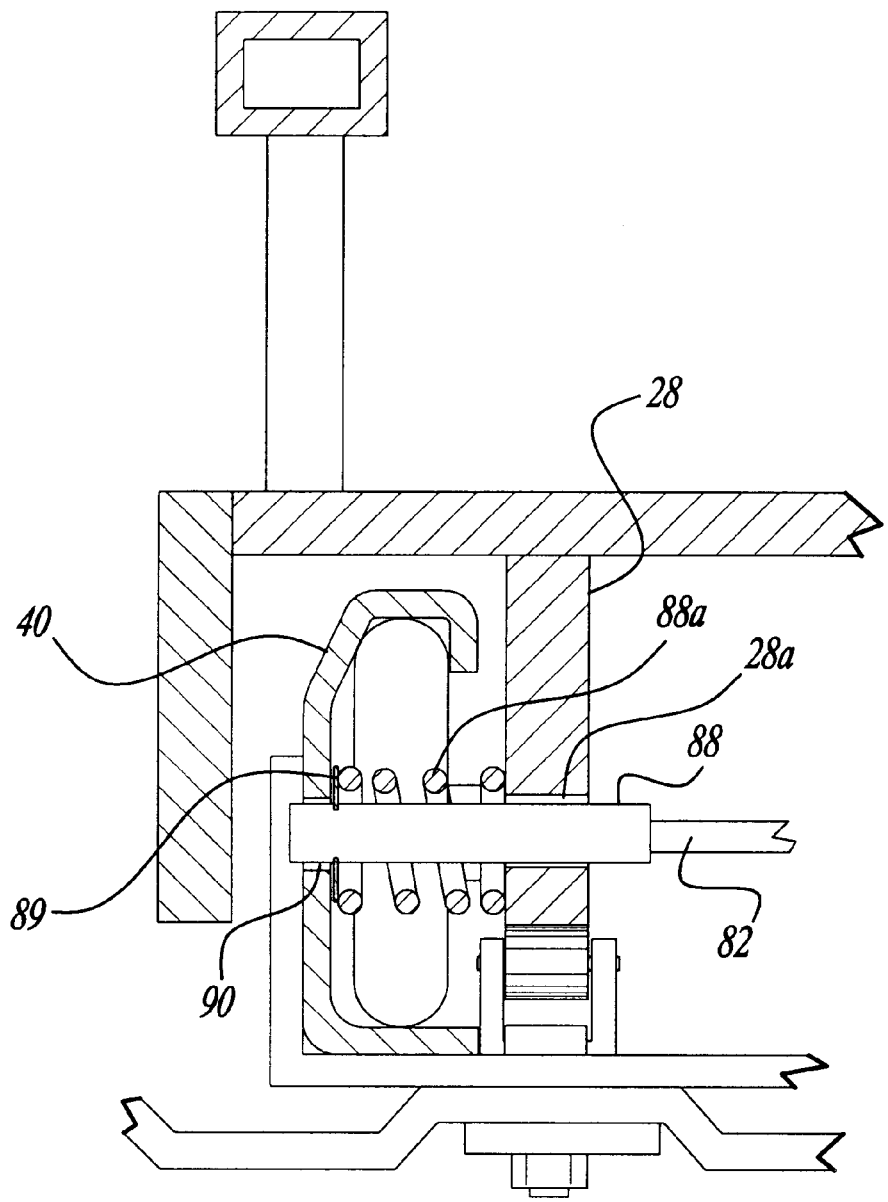
FIG. 7 is a sectional view taken through line 7—7 showing the locking mechanism of the tray shown in FIG. 6.

Still referring to FIG. 6, a tray locking mechanism 80 is located at the rearward end of the platform. The mechanism includes a cable 82 that is connected at the platform rearward end to a handle 84, and at the platform side 20 to a transversely movable spring-loaded locking pin 88, which includes a biasing spring 88a and is in communication with a grooved tension wheel 92 (FIG. 7), which is rotatably affixed to the platform bottom surface. The locking pin is mounted within a pin bracket 89, which in turn is mounted between the channel bracket 40 and the wheel mounting bar 28 through a mounting bar aperture 28a in a manner that orients the pin transversely relative to the channel bracket. The locking pin is thus selectively engageable with pin apertures 90 (FIG. 7) that are defined in the channel bracket 40.

If the handle 84 is rotated in a release direction, tension is placed on the spring 88a, causing the locking pin to be withdrawn from the particular aperture retaining the pin. The wheels housed in the channeled bracket therefore are unimpeded and freely rotatable. The tray may thus be slid forward or backward in relation to the directional arrow A to a desired location as limited only by the channel brackets.

If the spring-loaded locking pin is aligned with one of a plurality of channel bracket apertures 90 defined in the channel bracket 40 and the handle is rotated in the opposite, or locking direction, tension on the cable is released, and the spring urges the pin into the channel bracket in a frictional relationship with the channel bracket aperture. The wheels housed in the bracket are thus impeded, and are thereby prevented from rotating. The platform is thus locked in the desired position until the handle is rotated in the release direction.

Figure 5:
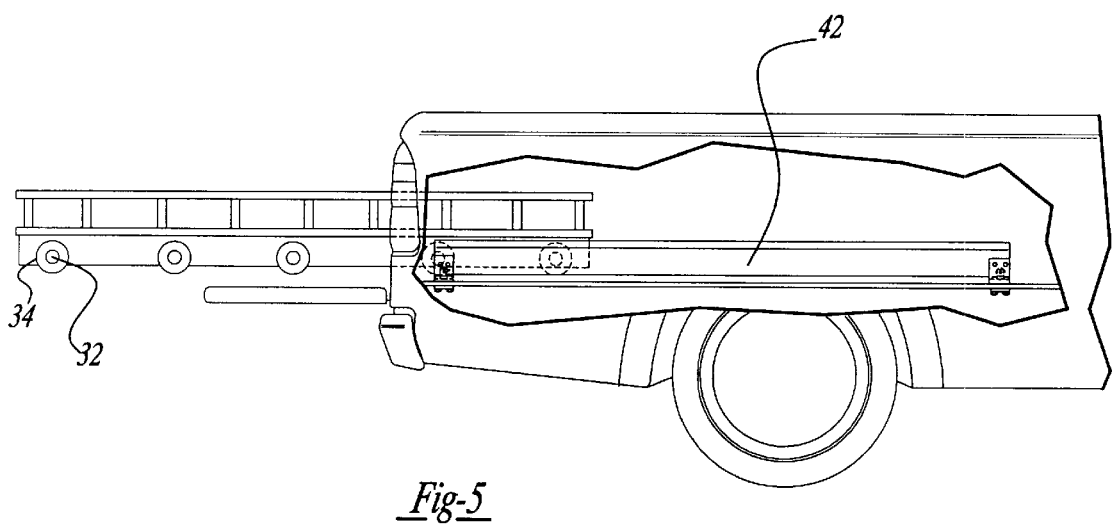
FIG. 5 is a side elevational view of the tray shown in FIG. 2, with the tray being extended out of the truck bed.

If the locking mechanism is released, the platform may be slid out of the rear of the truck as shown in FIG. 5, assuming that the truck rear gate has been lowered. The length of the truck bed may thus be effectively increased to accommodate payloads having a length greater than the length of the truck cab. The platform may also be extended in this manner to facilitate loading/unloading of the truck bed, or to better position tools or other apparatus, such as a compressor or a generator, in closer proximity to a worksite than would normally be possible. Also, due to the load-bearing capabilities of the wheels as supported by the channeled tracks, the platform is capable of supporting payloads that conventional extendable liners could not support.

Referring to FIG. 9, a tray according to a second preferred embodiment of the present invention is shown generally at 100. The tray is identical in structure and function to the tray 10. However, a storage device 102, rather than a cargo bar, is releasably affixed to the support rail 104. As shown in the sectional view in FIG. 10, the storage device defines a storage cavity 106 therein. A locking mechanism 108 is housed within the cavity and functions to lock/unlock the cargo bar to/from the support rail 104. The locking mechanism includes a rotatable handle 112. The handle 112 communicates with a trunnion 114 to selectively move the trunnion in/out of one of a plurality of locking apertures 116 defined in the support rail 104 to allow the device to roll on the platform 120 on rollers, such as the roller 122 shown in FIG. 10.

In operation, when the handle 112 is rotated to a locked position, as indicated at 124, the trunnion 114 is moved into the locking aperture 116. The device is thus effectively locked in a fixed platform location along the rail corresponding to the particular locking aperture. When the handle is rotated to a release position, indicated at 126, the trunnion is moved out of the locking aperture, thereby allowing the storage device to be bi-directionally moved along the rail in the direction indicated by the directional arrow A. The storage device may even be moved to the rearwardmost portion of the tray 100, and the tray extended to its rearwardmost position, as shown at 128 in FIG. 11, as the wheels, such as the wheel 130 transfer the load placed on the tray to the pickup truck bed, as described above in conjunction with the first preferred embodiment of the present invention.

Optionally, but preferably, the storage device 102 includes a plurality of apertures for receiving selectively detachable wheels which assist in the transport of the storage device when removed from the tray. Additionally, the top load bearing surface 17 may be provided with a layer including a gripping surface to preclude the displacement of objects stored thereon particularly when the object is not retained by the cargo bar 70.

As can be appreciated from the foregoing, the vehicle bed sliding tray of the present invention protects the truck bed, as well as the bed side walls and rear gate, from damage caused by loading and unloading of the bed. The tray of the present invention is also capable of supporting heavy payloads regardless of the location of the payload on the tray and regardless of the extended or retracted position of the tray portion supporting the payload. The tray of the present invention is also designed for easy installation as an aftermarket product, as it does not require expensive tools or labor for installation. In one embodiment, the vehicle bed sliding tray of the present invention is also designed with a storage device that is capable of being positioned in one of many locations on the bed liner itself and secured at that position to hold the payload and to minimize shifting of the payload.

While the above description constitutes the preferred embodiment of the present invention, it should be appreciated that the invention may be modified without departing from the proper scope or fair meaning of the accompanying claims. Various other advantages of the present invention will become apparent to those skilled in the art after having the benefit of studying the foregoing text and drawings taken in conjunction with the following claims.

I claim:

1. An extendable load bearing apparatus, comprising:
a load bearing tray that has longitudinal sides, a forward end, and a rear end, and that has downwardly projecting tray supports extending substantially along the longitudinal sides of the tray;
a plurality of rollers each housed within a roller bracket and secured to a workpiece, each of the plurality of rollers being in supporting relationship with one of the pair of downwardly extending tray supports;
at least one axle extending transversely from each of the pair of downwardly extending tray supports;
a wheel mounted in rotatable relationship to each of the axles to facilitate movement of the load bearing tray in a longitudinal direction; and
a pair of channel brackets each secured to the workpiece, each of the wheels being housed within one of the channel brackets to limit movement of the load bearing sliding tray in a longitudinal direction;
the rollers and the wheels comprising load bearing members that support the sliding tray to maximize the load bearing capability of the sliding tray regardless of the position of the tray in relation to the pair of channel brackets.

2. The apparatus of claim 1, wherein the channeled bracket comprises a C-shaped bracket defining a wheel track therein to facilitate bi-directional movement of the wheel while maintaining the wheel within the channel defined therein.

3. The apparatus of claim 1, further comprising a tray rail extending around the tray periphery and supportedly connected to the tray by rail supports.

4. The apparatus of claim 3, wherein the rail supports are metal rods affixed to the tray and extending upwardly from the tray in substantially transverse relationship therewith.

5. The apparatus of claim 3, further comprising storage means in slidable engagement with the rail and movable along the rail in a bi-directional manner, the storage means including a locking mechanism that is operative to selectively lock the storage means in a desired position along the rail.

6. The apparatus of claim 5, wherein the storage means comprises a storage container housing the locking mechanism therein.

7. The apparatus of claim 6, wherein the storage container includes a removable lid that includes securing means for securing the lid to the container to secure items stored therein.

8. The apparatus of claim 1, further comprising a tray locking mechanism that selectively locks the tray in a predetermined position on the tray.

9. The apparatus of claim 8, wherein the tray locking mechanism immobilizes at least one of the wheels housed in the channeled bracket.

10. The apparatus of claim 8, wherein the tray locking mechanism comprises a cabled turn key positioned at the tray aft end, the cabled turn key including a cable connected to the turn key at the aft end and to a retractable mechanism along one of the longitudinal sides and that is extendable into one of the channel brackets to immobilize one of the wheels housed in one of the channel brackets.

11. The apparatus of claim 1, wherein the slidable tray comprises an injection molded plastic tray designed for mounting in a pickup truck bed.

12. The apparatus of claim 11, wherein the extendable tray is extendable out of the truck bed, the extendable tray being capable of supporting payloads at the aft end when extended out of the pickup truck bed through operation of the wheels as load bearing members.

13. The apparatus of claim 1, further comprising at least two mounting bars secured to the workpiece via mounting bar brackets to secure the channel brackets in a predetermined spaced apart relationship.

14. The apparatus of claim 13, wherein the roller brackets are affixed to the mounting bars in a spaced apart relationship relative to one another and in alignment with the tray support members.

15. The apparatus of claim 1, further comprising:

a plurality of axles extending transversely from each of the pair of downwardly extending tray supports; and a plurality of wheels each mounted in rotatable relationship to one of the plurality of axles to facilitate movement of the load bearing tray in a longitudinal direction.

16. A sliding tray for an extendable pickup truck bed, comprising:

a load bearing bed cover member including support members extending downwardly and running substantially along the longitudinal sides of the cover member;

a pair of rollers each rotatably mounted via a roller bracket to the truck bed in a load bearing relationship with the downwardly extending support members;

track means secured to the pickup truck bed and being in movable relationship with the support members to facilitate bi-directional longitudinal movement of the cover member;

the track means also being in a load bearing relationship with the cover member to transfer a load moment from the cover member to the truck bed to increase the load bearing capacity of the cover member independent of the extended or retracted position of the cover member.

17. The sliding bed of claim 16, wherein the track means comprises:

at least one axle extending transversely from each of the support members;

a wheel mounted in rotatable relationship to each of the axles to facilitate movement of the sliding tray; and a pair of channel brackets each secured to the workpiece, each of the wheels being housed within one of the channel brackets to limit movement of the sliding bed in a bi-directional longitudinal direction.

18. The sliding bed of claim 17, wherein the rollers and the wheels comprise load bearing members that support the sliding bed to maximize the load bearing capability of the sliding bed regardless of the position of the tray in relation to the pair of channel brackets.

19. The sliding bed of claim 17, further comprising a storage device that is selectively locked into a stationary position on the sliding bed, the storage device including a plurality of rollers that facilitate movement of the storage device on the sliding bed when the storage device is selectively unlocked from the stationary position.

* * * * *